(12) United States Patent
Sakaguchi et al.

(10) Patent No.: US 11,958,569 B2
(45) Date of Patent: Apr. 16, 2024

(54) FLOAT ASSEMBLY

(71) Applicant: KYORAKU CO., LTD., Kyoto (JP)

(72) Inventors: Tsutomu Sakaguchi, Osaka (JP);
Hirofumi Nagai, Osaka (JP);
Yasunobu Ueda, Osaka (JP); Takaya Niimi, Osaka (JP); Ayumu Yukawa, Osaka (JP)

(73) Assignee: KYORAKU CO., LTD., Kyoto (JP)

( * ) Notice: Subject to any disclaimer, the term of this patent is extended or adjusted under 35 U.S.C. 154(b) by 423 days.

(21) Appl. No.: 17/294,520

(22) PCT Filed: Nov. 22, 2019

(86) PCT No.: PCT/JP2019/045750
§ 371 (c)(1),
(2) Date: May 17, 2021

(87) PCT Pub. No.: WO2020/110928
PCT Pub. Date: Jun. 4, 2020

(65) Prior Publication Data
US 2022/0024542 A1    Jan. 27, 2022

(30) Foreign Application Priority Data

Nov. 29, 2018 (JP) ................................ 2018-224101
Feb. 13, 2019 (JP) ................................ 2019-023461

(51) Int. Cl.
*B63B 35/44* (2006.01)
*A01K 45/00* (2006.01)
(Continued)

(52) U.S. Cl.
CPC ................ *B63B 1/32* (2013.01); *A01K 45/00* (2013.01); *B63B 11/00* (2013.01); *B63B 35/44* (2013.01);
(Continued)

(58) Field of Classification Search
CPC ........... B63B 1/32; B63B 11/00; B63B 35/44; B63B 2035/4453; B63B 43/06;
(Continued)

(56) References Cited

U.S. PATENT DOCUMENTS

2013/0146127 A1\* 6/2013 Lunoe .................... F24S 20/70
136/251
2017/0085214 A1    3/2017 Niimi
(Continued)

FOREIGN PATENT DOCUMENTS

CN        101973634 A    2/2011
CN        201918396 U    8/2011
(Continued)

OTHER PUBLICATIONS

Office Action issued on Nov. 25, 2022, in corresponding Indian Application No. 202147022599; 5 pages.
(Continued)

*Primary Examiner* — Andrew Polay
(74) *Attorney, Agent, or Firm* — Maier & Maier, PLLC

(57) ABSTRACT

An object of the present invention is to provide a float assembly that can prevent the floats from flipping. The present invention provides a float assembly including a plurality of floats connected together comprising: a filled float having a hollow portion, wherein the hollow portion has a part filled with a filler, and the filled float is arranged at a position facing an assembly periphery surrounding the float assembly.

6 Claims, 16 Drawing Sheets

(51) Int. Cl.
  *B63B 1/32* (2006.01)
  *B63B 11/00* (2006.01)
  *H02S 10/40* (2014.01)

(52) U.S. Cl.
  CPC ...... *H02S 10/40* (2014.12); *B63B 2035/4453* (2013.01)

(58) Field of Classification Search
  CPC ......... B63B 35/38; A01K 45/00; H02S 10/40; H02S 20/00; Y02E 10/50
  See application file for complete search history.

(56) References Cited

U.S. PATENT DOCUMENTS

| | | |
|---|---|---|
| 2018/0015989 A1 | 1/2018 | Lee et al. |
| 2019/0168848 A1 | 6/2019 | Niimi et al. |

FOREIGN PATENT DOCUMENTS

| | | | |
|---|---|---|---|
| GB | 2549483 A | | 10/2017 |
| JP | S59-58957 U | | 4/1984 |
| JP | 2015-217771 A | | 12/2015 |
| JP | 2018-016287 A | | 2/2018 |
| JP | 2018-016288 A | | 2/2018 |
| JP | 2018-502777 A | | 2/2018 |
| JP | 2018-047731 A | | 3/2018 |
| KR | 20180038327 A | * | 10/2016 |
| WO | 2007/062278 A2 | | 5/2007 |
| WO | 2016108561 A1 | | 7/2016 |

OTHER PUBLICATIONS

International Search Report issued on Feb. 18, 2020 in corresponding International Application No. PCT/JP2019/045750; 10 pages.
"News guide: Field trip for press of the largest float-type mega solar power generation facility using water surface of dam in Japan", 2017 [retrieval date Jan. 31, 2020], Internet :<URL:https://fpcj.jp/wp/wp-content/uploads/2017/10/presschibajp.pdf> Foreign Press Center Japan.
Kitano, Masato et al., "A survey of bird droppings at the medium-scale photovoltaic power station", Solar energy, 2015, vol. 41, No. 6, pp. 57-61.
Yamaguchi, Yasuhiro et al., "Alternative feed as a means of reducing damage to direct sown rice by the Oriental Turtle Dove", *Streptopelia orientalis*, Japanese Journal of Ornithology, 55(1), Jan. 20, 2006, pp. 1-6.
Mukai, Akie et al., "Paddy Fields-Habitats of Birds", Journal of the Agricultural Engineering Society, Japan, 2001, vol. 69, No. 9, pp. 957-961.
Natural energy utilization report No. 20, Generation of power by floating fifty thousand solar panels on dam, Largest Mega Solar in Ichihara city, Chiba Prefec, Mar. 15, 2019 [ retrieval date Jan. 31, 2020], internet: <URL:https://www.renewable-ei.org/pdfdownload/activities/column_REapplication20 2O19O3.pdf>.
Office Action issued on Mar. 23, 2023 in corresponding Taiwanese Application No. 108143113; 11 pages.

* cited by examiner

FIG. 2
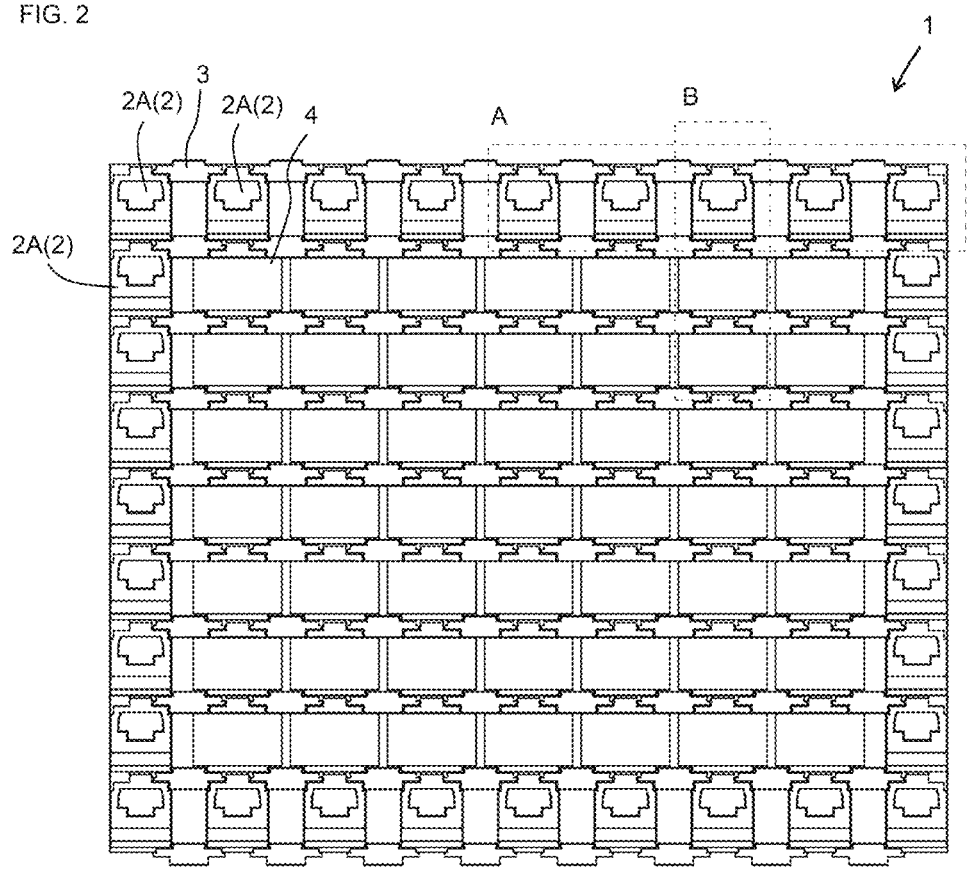
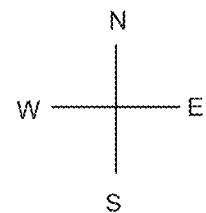

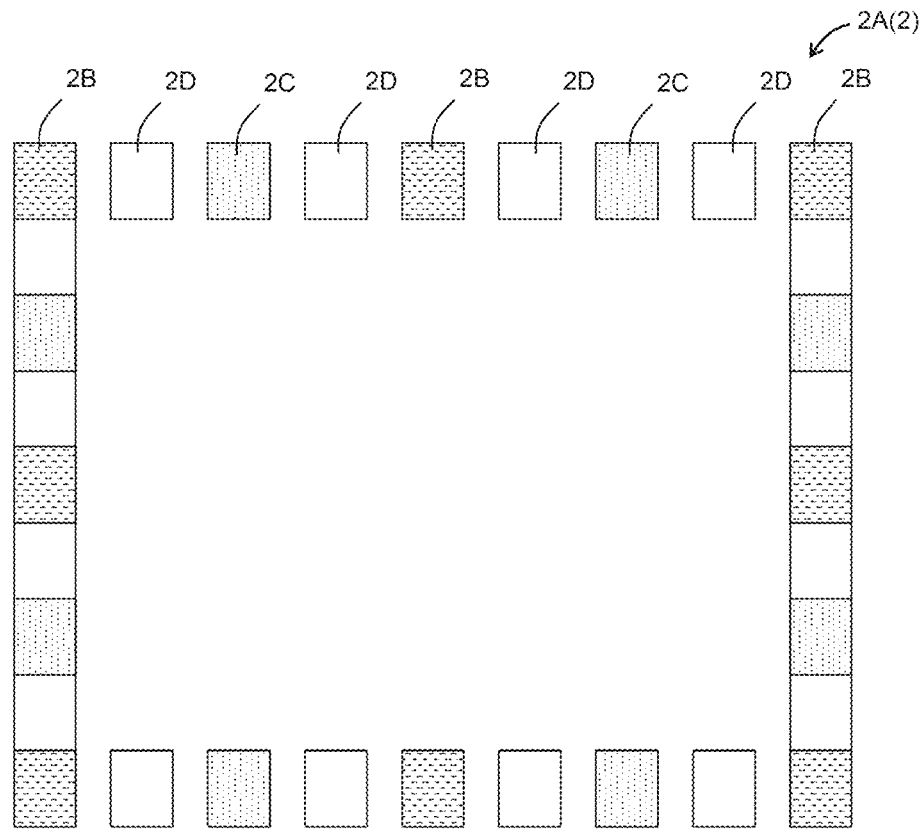
FIG. 3
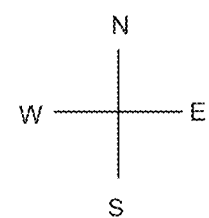

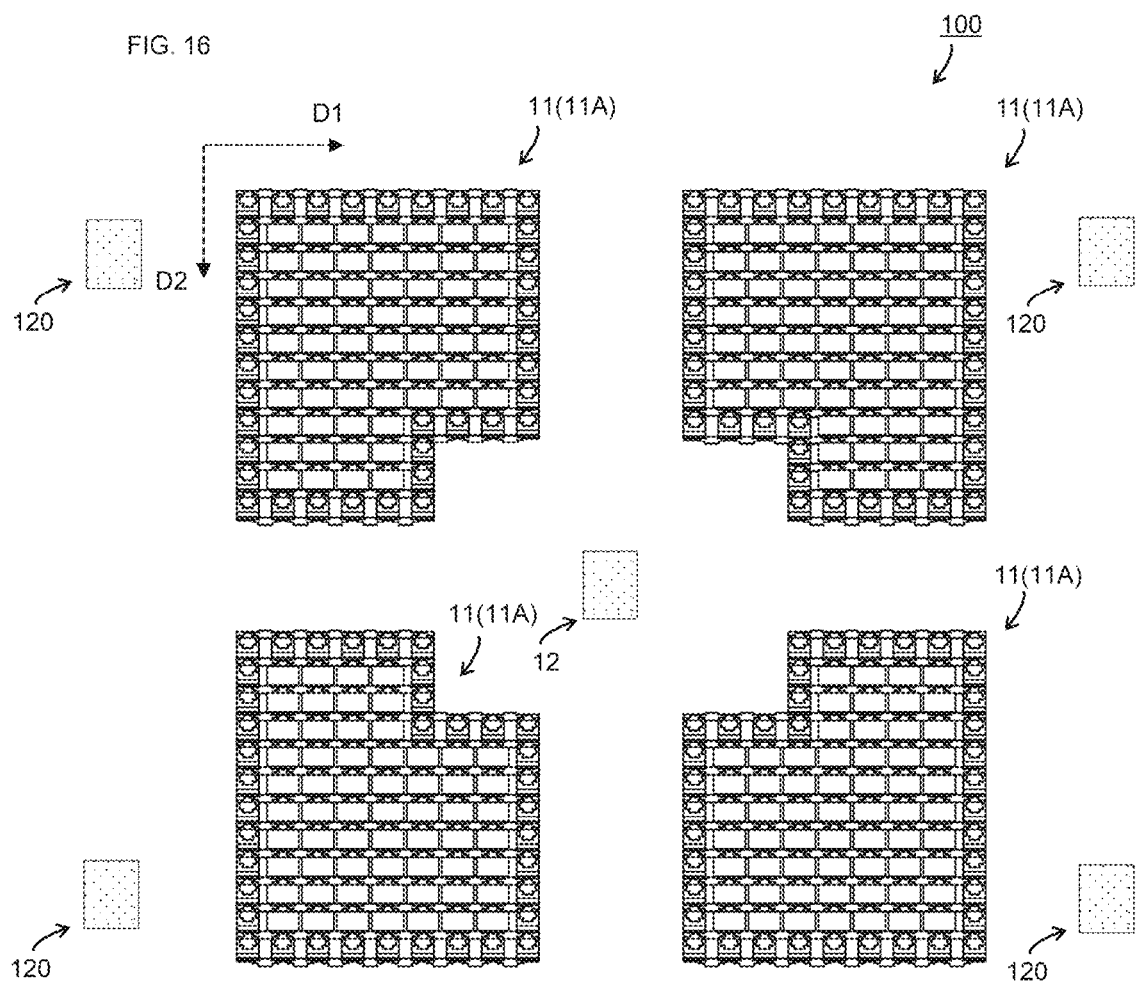

FLOAT ASSEMBLY

TECHNICAL FIELD

The present invention relates to a float assembly including a plurality of floats connected together.

BACKGROUND ART

First Viewpoint

Patent literature 1 discloses the float assembly including a plurality of floats which is connected one another.

Second Viewpoint

A photovoltaic generation device is equipped with a solar panel as a photoelectric converting device. Some solar panels are installed on the roof, wall, or ground of a building, for example, while others are installed on a float (see, for example, patent literature 2). The float described in patent literature 2 can be floated on the water surface of a pond or lake, for example, to make effective use of the area as a place for a photovoltaic generation.

CITATION LIST

Patent Literature

[Patent Literature 1] Japanese Unexamined Patent Application No. 2018-16288
[Patent Literature 2] Japanese Unexamined Patent Application No. 2015-217771

SUMMARY OF INVENTION

Technical Problem

First Viewpoint

In the float assembly described in the patent literature 1, floats on the periphery of the float assembly may be used as passageways without solar panels. Such floats may be flipped when waves pass through the floats.

An object of the present invention is to provide a float assembly that can prevent the floats from flipping.

Second Viewpoint

When the float described in patent literature 2 is floating on a pond or water surface, birds may land on the float or the solar panel. Birds referred to here are not limited to, for example, birds that live on land, but also include waterfowl and seabirds. Also, these birds are not limited to wild birds, but also include, for example, free-range birds. If birds land on the float or the solar panel, they may damage or pollute the float or the solar panel. If the float or the solar panels are damaged, the photovoltaic generation device may not be able to generate power. Also, If the solar panels are polluted, the power generation efficiency of the photovoltaic generation device may decrease, and the maintenance cost may increase.

An object of the present invention is to provide a float assembly that can prevent birds from landing on the solar panels and the floats on which solar panels are installed.

Solution to Problem

First View Point

The present invention provides a float assembly including a plurality of floats connected together comprising: a filled float having a hollow portion, wherein the hollow portion has a part filled with a filler, and the filled float is arranged at a position facing an assembly periphery surrounding the float assembly.

In the float assembly of the present invention, the filled float, having the hollow portion having the part filled with the filler, is arranged on the outer periphery of the float assembly. Since the sunk amount of the filled float is larger than the sunk amount of the float without the load, it is possible to prevent the floats from flipping as the waves pass through the floats.

Various embodiments of the present invention are described below. Any of the embodiments described below can be combined with one another.

Preferably, the filler is a fluid.

Preferably, the filled float is inclined so that a sunk amount increases toward the assembly periphery.

Preferably, in a state that the float assembly floats on a water surface, the filled float has an inclined surface becoming lower toward the assembly periphery, and the inclined surface is a portion which is provided on a side surface of the filled float facing the assembly periphery and is above the water surface.

Preferably, in a state that the float assembly floats on a water surface, a parting line of the filled float has a part located below the water surface.

Preferably, one end of a mooring member is not anchored to the filled float.

Second Viewpoint

The present invention provides a float assembly comprising: a power generation part; and an attracting part adjoined to the power generation part, wherein the power generation part includes a first float and a solar panel, the solar panel is provided in the first float, and the attracting part includes a second float and is configured to attract birds.

In the float assembly of the present invention, since the attracting part configured to attract birds is adjoined to the power generation part provided with the solar panel, it is possible to attract birds to the attracting part and to prevent birds from landing on the power generation part.

Various embodiments of the present invention are described below. Any of the embodiments described below can be combined with one another.

Preferably, the attracting part is configured to attract the birds by a color of the attracting part or a surface material of the attracting part.

Preferably, a surface of the attracting part has a higher brightness than a surface of the power generation part.

Preferably, the second float is surrounded by the first float.

Preferably, the second float is provided apart from the first float.

Another aspect of the embodiment of the present invention provides a float assembly comprising: a power generation part; and a function part, wherein the power generation part includes a first float and a solar panel, the function part includes a second float provided apart from the first float, and the number of the solar panel per area of the power generation part is larger than the number of the solar panel per area of the function part.

BRIEF DESCRIPTION OF DRAWINGS

FIG. 2 is a top view of the float assembly 1.
FIG. 3 is a schematic view of schematically displayed each float 2, with a peripheral float 2A extracted from FIG. 2. The peripheral float 2A includes a mooring float 2B, a filled float 2C, and a free float 2D, and these floats 2B, 2C, and 2D are displayed separately as different patterns in FIG. 3.

FIG. 16 is a top view of a modification of the float assembly 100.

DESCRIPTION OF EMBODIMENTS

Hereinafter, embodiments of the present invention will be described with reference to the drawings. Any of the embodiments described below can be combined with one another. And the invention is established independently for each feature.

Embodiment of First Viewpoint

Figure 1:
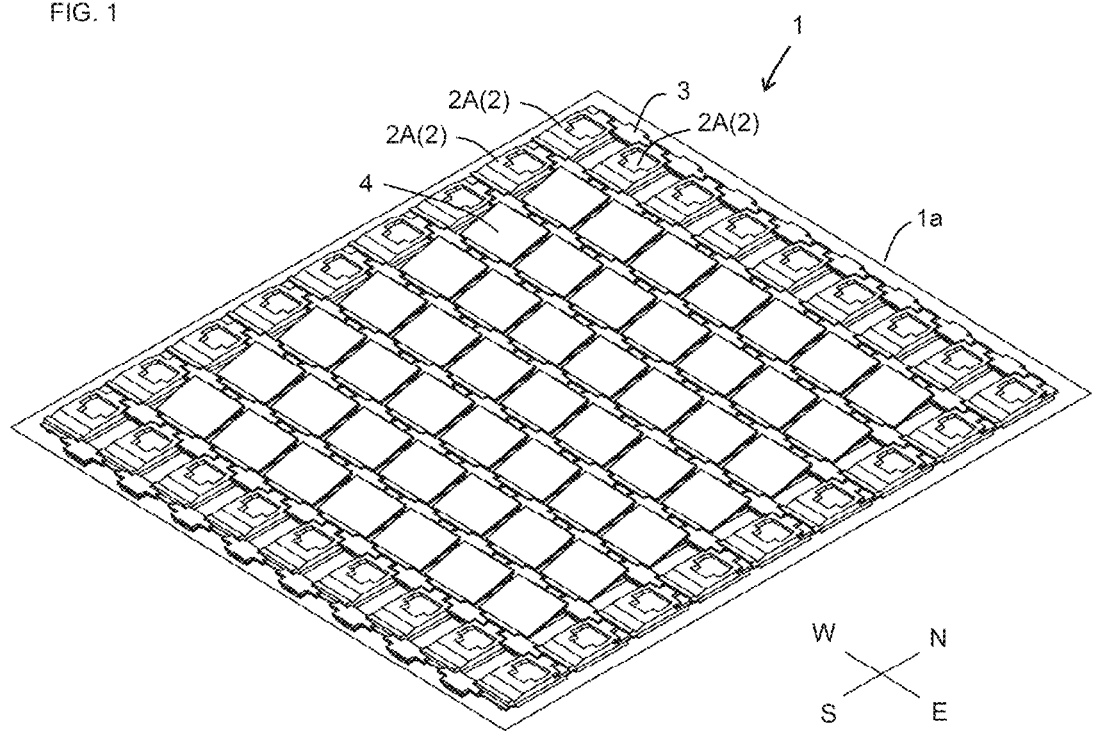
FIG. 1 is a perspective view of a float assembly 1.

As shown in FIGS. 1 and 2, the float assembly 1 in the embodiment of the present invention is used by floating on the water surface such as a pond or lake, and is configured by connecting a plurality of floats 2. In the following description, east (E), west (W), south (S), and north (N) follow the definitions shown in FIG. 1.

A plurality of floats 2 is connected directly or via a joint 3. More specifically, the two floats 2 adjacent in the north-south direction are directly connected, and the two floats 2 adjacent in the east-west direction are connected via a joint 3.

Figure 4:
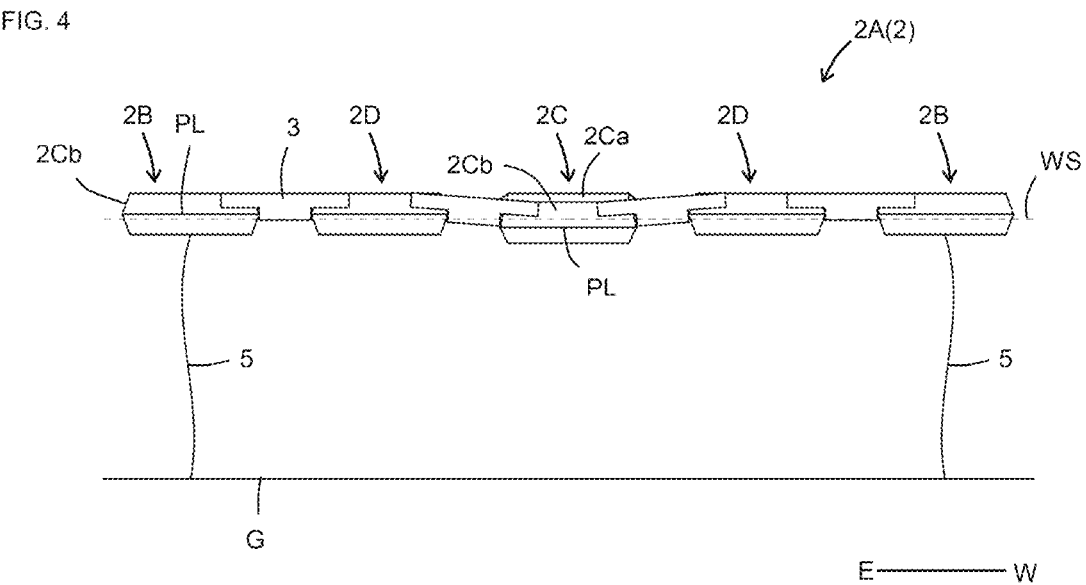
FIG. 4 is a schematic view of a state which the peripheral float 2A and a joint 3 included in region A in FIG. 2 are seen from the north side.
Figure 5:
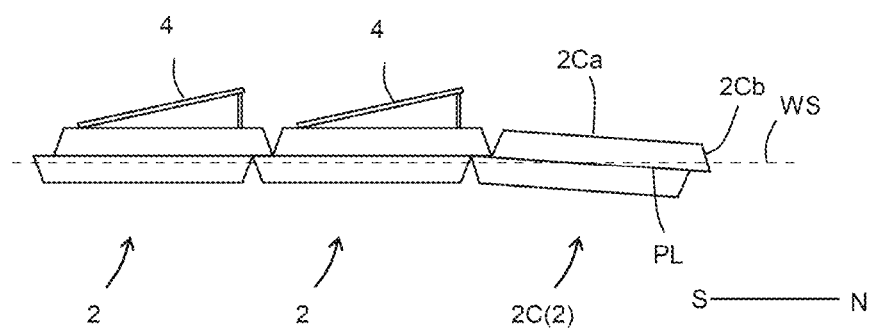
FIG. 5 is a schematic view of a state which the peripheral float 2A and a solar panel 4 included in region B in FIG. 2 are seen from the east side.

Each float 2 is formed by, for example, blow molding in which a molten tubular parison is sandwiched between a plurality of split dies and inflated, and various thermoplastic resins can be used as the molding material. Polyolefin-based resins such as polyethylene and polypropylene can be preferably used. The float 2 has a rectangular shape as a whole, and has a hollow portion for accommodating gas (air or the like) inside. As shown in FIGS. 4 and 5, a parting line PL derived from the split surface of the split dies at the time of blow molding is provided on the side surface of the float 2. The joint 3 is also formed by blow molding and also has a hollow portion.

The float 2 is loaded with loads such as solar panels 4, cables, a power conditioner, a junction box, etc. (the loads other than the solar panels 4 are not shown). Many floats 2 are equipped with the solar panels 4, which enables the solar panels 4 to generate power. The solar panels 4 are mounted in an inclined position so that the light-receiving surface faces south to increase the power generation efficiency. The power generated by the solar panels 4 is transmitted through the cables. The DC power from a plurality of the solar panels 4 is collected through the cables to the junction box, and the DC power from the junction box is converted to the AC power by the power conditioner. The junction box and the power conditioner may be installed on the ground instead of on the float 2. Hereinafter, the float 2 with the loads is referred to as a "loaded float", and the float 2 without the loads is referred to as an "unloaded float".

The float 2 facing an assembly periphery 1a surrounding the float assembly 1 is usually not loaded with the solar panels 4 or other loads and is used as a passageway. Hereinafter, the float 2 as described above is referred to as a "peripheral float", and another float 2 is referred to as an "inner float".

The peripheral float 2A is arranged along the assembly periphery 1a so as to surround the inner float. As shown in FIG. 4, one end of a mooring member 5 such as an anchor rope is anchored to a part or all of the peripheral float 2A. The other end of the mooring member 5 is connected to an anchor sunk in the bottom G of the pond or lake, or anchored to the land around the pond or lake. This prevents the float 2 from floating and the float assembly 1 from being washed away.

Hereinafter, the float 2 to which one end of the mooring member 5 is anchored referred to as a "mooring float", and the float 2 to which one end of the mooring member 5 is not anchored is referred to as a "non-mooring float".

As shown in FIG. 3, the number of the non-mooring floats continuously existing between two adjacent the mooring floats 2B ("the number of continuous the non-mooring floats") is preferably 10 or less, more preferably 5 or less, and even more preferably 3 or less. If the number of continuous the non-mooring floats is too large, the non-mooring float will be particularly easier to float. In this embodiment, the number of continuous the non-mooring floats is 3.

The ratio of the number of the mooring floats 2B to the number of the peripheral floats 2A is preferably 5 to 100%, more preferably 20 to 80%. If this ratio is too low, the non-mooring float will be particularly easier to float. On the contrary, if this ratio is too high, the work for installing the mooring member 5 can be excessive. This ratio may specifically be, for example, 5, 10, 20, 30, 40, 50, 60, 70, 80, 90, or 100%, and maybe within the range between any two of the values described here. In this embodiment, this ratio is 25%.

The ratio of the number of the mooring floats 2B to the number of the peripheral floats 2A is preferably the north end or the east end or the west end≥the south end. Since the solar panel 4 is inclined to the south, when a north wind blows, a force in the direction of lifting the solar panel 4 is applied near the northern end of the float assembly 1, and as a result, the float 2 is easier to float. Therefore, it is preferable to increase the above ratio at the northern end of the float assembly 1 to prevent the float 2 from floating. Also, in this embodiment, two floats 2 adjacent to each other in the north-south direction are directly connected by overlapping the floats 2, whereas two floats 2 adjacent to each other in the east-west direction are connected via the joint 3. The joint 3 is an elongated member, and is easily deformed when a bending force is applied in a direction perpendicular to the longitudinal direction of the joint 3. Therefore, the float 2 located at the eastern end or the western end is also easier to float, and it is preferable to increase the above ratio at the eastern end or the western end of the float assembly 1 in order to prevent the float 2 from floating. On the other hand, when a south wind blows, a force in the direction of pressing the solar panel 4 is applied near the southern end of the float assembly 1, and as a result, the float 2 is suppressed from floating. Thus, at the southern end of the float assembly 1, the above ratio may be low. Therefore, it is preferable that the above relational expression holds.

In some or all of the peripheral floats 2A, at least part of its hollow portion is filled with the filler. Hereafter, such a float 2 is referred to as a "filled float", and a float 2 that is not filled with the filler is referred to as an "unfilled float". The filled float and the unfilled float preferably have the same shape, in which case the only difference between the two is the presence or absence of the filler.

The filler is any material that can be filled into the hollow portion of the filled float 2C to increase the sunk amount of filled float 2C. Therefore, in a state that the float assembly 1 floats on a water surface WS, the sunk amount of the filled float 2C is larger than that of the unloaded float and as a result, it can prevent the filled float 2C from flipping. Also, being suppressed the flip of the filled float 2C is also suppressed the flip of the other float 2 connected to the filled float 2C. Additionally, Since the filled float 2C has a lower center of gravity than the unfilled float, the filled float 2C is also highly stable as a passageway.

The filling method of the filler is not particularly limited. The filler may be filled through the openings, which are formed in the wall after the production of the filled float 2C and are connected to the hollow portion, or the filler may be inserted when the filled float 2C is blow molded. The former is preferable because there is no need to distinguish between the filled float and the unfilled float until the filler is filled. In the former case, it is preferable to seal the opening after filling to prevent the filler from leaking out.

As for the filler, it should be a fluid such as a liquid or powder, and water is even more preferable. In the case where the filler is a fluid, if the filled float 2C is slightly inclined, the fluid will move toward a lower direction as it is inclined, thus the center of gravity of the filled float 2C will be lowered and the inclined state of the filled float 2C will be stabilized. The water is preferable because it is easy to procure the water locally when the float assembly 1 is filled with the filler at the installation site, and there is little risk of environmental pollution in the event of leakage.

The filling ratio of the filler is not limited, and the volume of the filler in the hollow portion of the filled float 2C is preferably 1 to 70%, more preferably 30 to 50%. Specifically, for example, the filling ratio of the filler is 1, 5, 10, 20, 30, 40, 50, 60, or 70%, and maybe within the range between any two of the values described here. This prevents the filled float 2C from being submerged when a worker is on top of the filled float 2C because the buoyancy of the filled float 2C is not too small.

It is preferable for the filled float 2C to have a buoyancy of 50 kgf or more, and even more preferable to have a buoyancy of 100 kgf or more when the entire filled float 2C is sunk in the water. This buoyancy is, for example, 50, 60, 70, 80, 90, 100, 150, 200, 250, or 300 kgf, and maybe within the range between any two of the values described here.

As shown in FIG. 5, it is preferable for the filled float 2C to be inclined so that the sunk amount increases toward the assembly periphery 1a, and it is preferable for the upper surface 2Ca of the filled float 2C to be inclined in the same way. In this case, when the wave passes through the filled float 2C, a force in the direction of pressing the filled float 2C is applied, so that the flip of the filled float 2C is more effectively suppressed. It is preferable for the inclined angle to be between 1 and 20 degrees, specifically, for example, 1, 2, 3, 4, 5, 6, 7, 8, 9, 10, or 20 degrees, and may be within the range between any two of the values described here.

Additionally, in a state that the float assembly 1 floats on the water surface WS, it is preferable for the filled float 2C to have the inclined surface that lowers toward the assembly periphery 1a. The inclined surface is a portion 2Cb of the side surface facing the assembly periphery 1a, which is above the water surface WS (Preferably, the portion 2Cb is provided in a position higher than 5 cm below the water surface WS, and even more preferably, the portion 2Cb is provided in a position higher than 10 cm below the water surface WS). In this case, when the wave passes through the filled float 2C, a force in the direction of pressing the filled float 2C is applied, so that the flip of the filled float 2C is more effectively suppressed. Also, in addition, due to vertical fluctuations of the water surface due to waves, the water surface may become lower immediately before the waves pass, and the water surface may become lower than normal. In consideration of this lowering of the water surface, it is preferable that the portion 2Cb provided in the position higher than 5 cm or 10 cm below the water surface WS is the inclined surface. It is preferable for the inclined angle of the inclined surface to be between 1 and 45 degrees, specifically, for example, 1, 2, 3, 4, 5, 6, 7, 8, 9, 10, 20, 30, 40, or 45 degrees, and maybe within the range between any two of the values described here.

In addition, as shown in FIG. 5, in a state that the float assembly 1 floats on a water surface, it is preferable that at least part of the parting line PL of the filled float 2C is located below the water surface WS. The parting line PL of the filled float 2C is generally located near the center of the vertical direction of the filled float 2C, and the parting line PL of the unfilled float is generally located above the water surface WS. In this embodiment, at least a part of the parting line PL is located below the water surface WS, which lowers the center of gravity of the filled float 2C and suppresses the flip of the filled float 2C more effectively.

The number of the unfilled floats that exist continuously between two adjacent the filled floats 2C ("the number of continuous the unfilled floats") is preferably less than 10, more preferably less than 5, and even more preferably less than 3. If this number is too large, the unfilled float is easier to flip. In this embodiment, the number of continuous the unfilled floats is 3.

The ratio of the number of the filled floats 2C to the number of the peripheral floats 2A is preferably 5 to 100%, more preferably 20 to 80%. If this ratio is too low, the unfilled float is especially easier to flip. If this ratio is too high, the work for filling the filler can be excessive. This ratio may specifically be, for example, 5, 10, 20, 30, 40, 50, 60, 70, 80, 90, or 100%, and maybe within the range between any two of the values described here. In this embodiment, this ratio is 25%.

The filled float 2C may be the mooring float or the non-mooring float, but is preferably the non-mooring float. Since the mooring float is anchored to the mooring member 5, it is difficult to flip when the wave passes through the mooring float. Therefore, the technical effect of using the mooring float as the filled float 2C is not significant. On the other hand, Since the non-mooring float is not anchored to the mooring member 5, the technical effect of using the non-mooring float as the filled float 2C to suppress the flip is significant. However, the water level in a pond is not constant, and the length of the mooring member 5 is generally determined based on the assumption of maximum water level. Therefore, when the water level is lower than the maximum water level, the mooring member 5 is in a loose state. In this state, when a wave hits the float assembly 1, the whole of the float assembly 1 moves to reduce the effect of the wave attack, however when the momentum of the wave is strong, the float 2 in the end row of the float assembly 1 is lifted up before the whole of the float assembly 1 moves, as a result, there is a risk that even the mooring float will flip when the wave passes through. Therefore, using the mooring float as the filled float 2C suppresses the flip of the mooring float when the water level is low.

The ratio of the number of the filled floats 2C to the number of the non-mooring floats is preferably 5 to 100%, more preferably 20 to 80%. If this ratio is too low, the unfilled float is especially easier to float. If this ratio is too high, the work for filling the filler can be excessive. This ratio may specifically be, for example, 5, 10, 20, 30, 40, 50, 60, 70, 80, 90, or 100%, and maybe within the range between any two of the values described here. In this embodiment, this ratio is 33%.

The ratio of the number of the filled floats 2C to the number of the peripheral floats 2A is preferably the north end or the east end or the west end≥the south end. The reason is as described for the mooring float 2B.

A float in the peripheral float 2A that is the non-mooring float and the unfilled float is referred to as a "free float", and a float in the peripheral float 2A that is the mooring float or the filled float is referred to as a "non-free float".

The ratio of the number of the free floats 2D to the number of the peripheral floats 2A is preferably 0 to 80%, and even more preferably 10 to 60%. If this ratio is too high, the free float 2D is easier to flip. If this ratio is too low, the work for mooring or filling can be excessive. This ratio may specifically be, for example, 0, 10, 20, 30, 40, 50, 60, 70, or 80%, and maybe within the range between any two of the values described here. In this embodiment, this ratio is 50%.

The average number of free floats 2D sequences is preferably 3 or less, more preferably 2 or less, and even more preferably 1.5 or less. This is because the free float 2D is easier to flip if the free floats 2D exist in sequence. The number of free floats 2D sequences means the number of free floats 2D that exist between two adjacent non-free floats. In this embodiment, in all parts, the number of free float 2D sequences is 1, and their average is also 1.

The ratio of the number of the non-free float to the number of the peripheral floats 2A is preferably the north end or the east end or the west end≥the south end. The reason is as described for the mooring float 2B.

Embodiment of the Second Viewpoint

1. Embodiment

Figure 6:
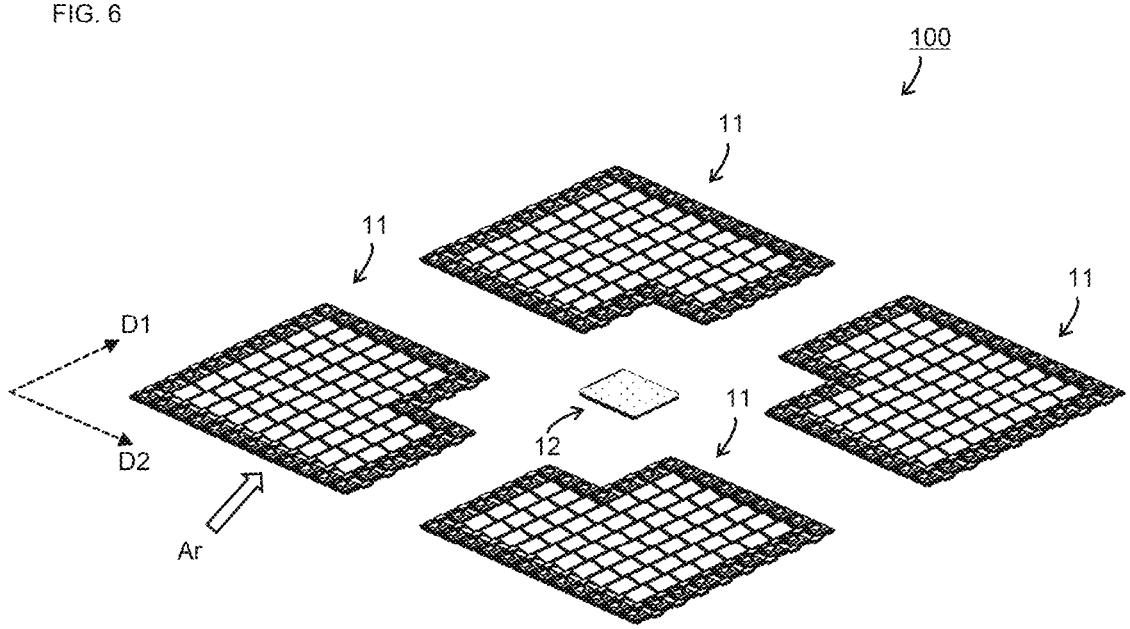
FIG. 6 is a perspective view of a float assembly 100.
Figure 7:
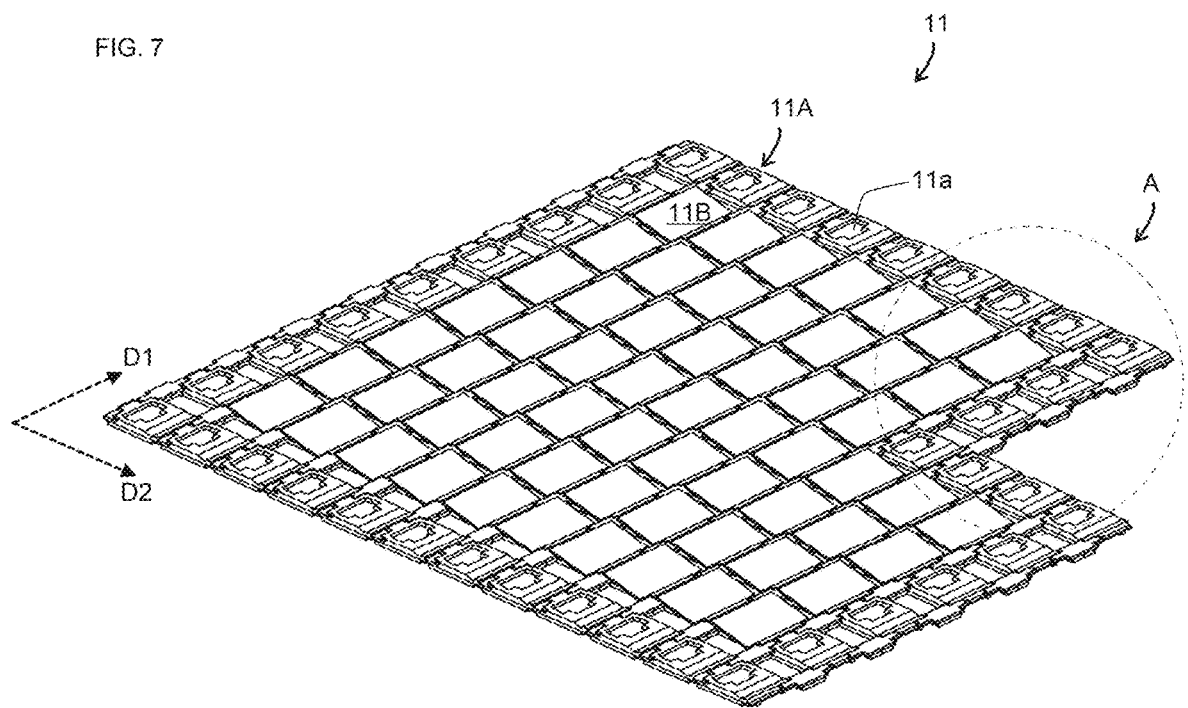
FIG. 7 is an enlarged view of one of four power generation parts 11 (see the arrow Ar in FIG. 6) shown in FIG. 6.
Figure 8:
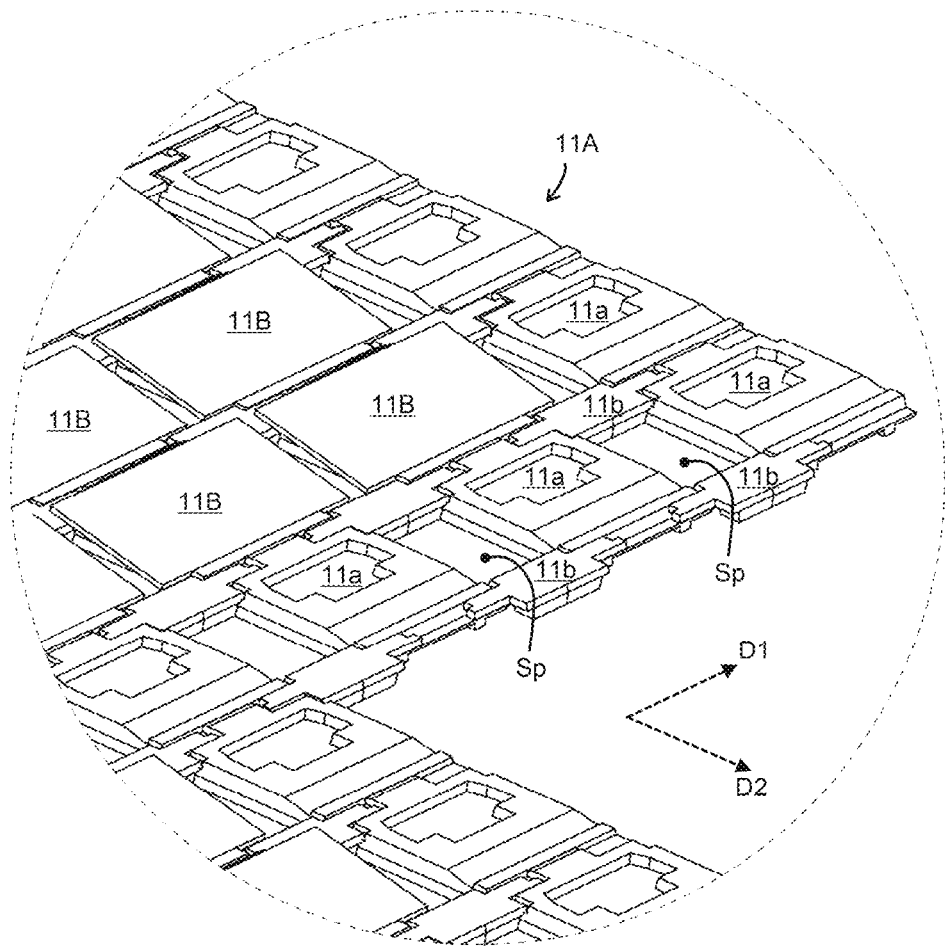
FIG. 8 is an enlarged view of region A shown in FIG. 7.
Figure 9:
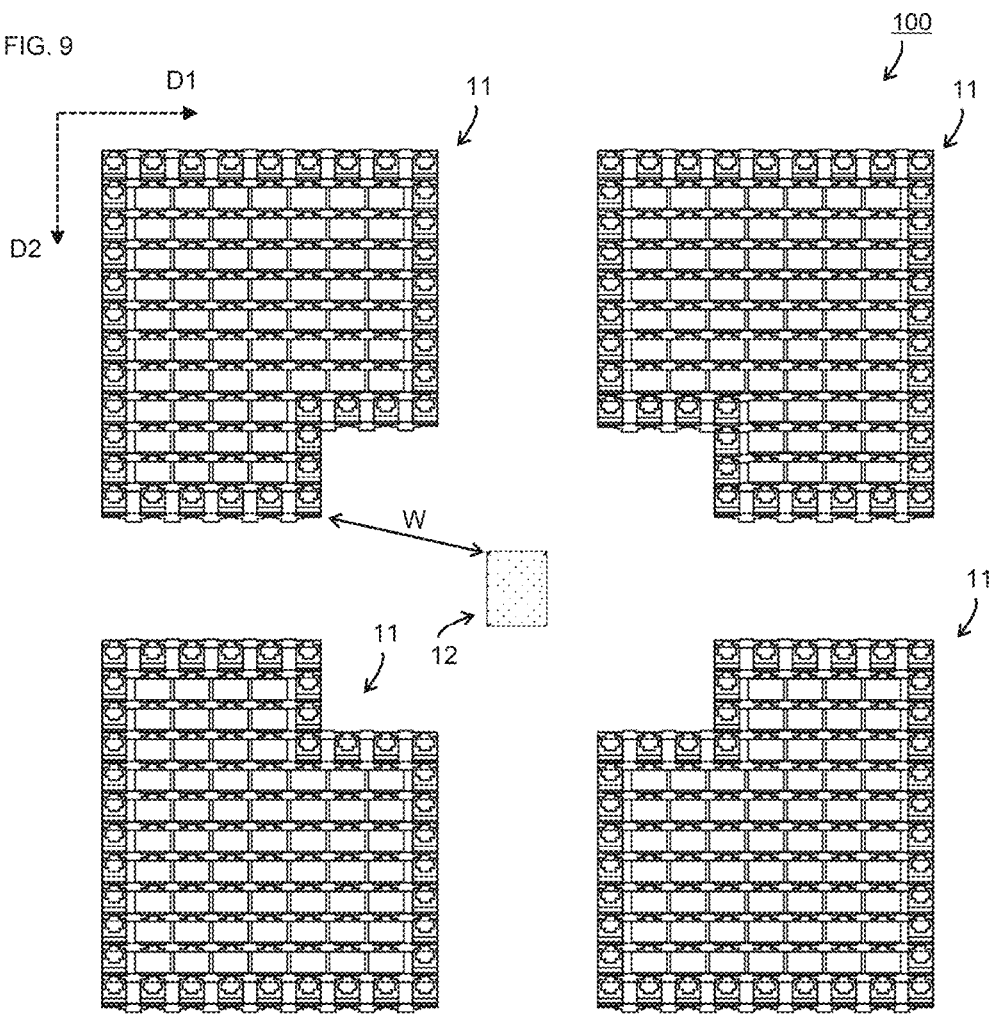
FIG. 9 is a top view of the float assembly 100.
Figure 10:
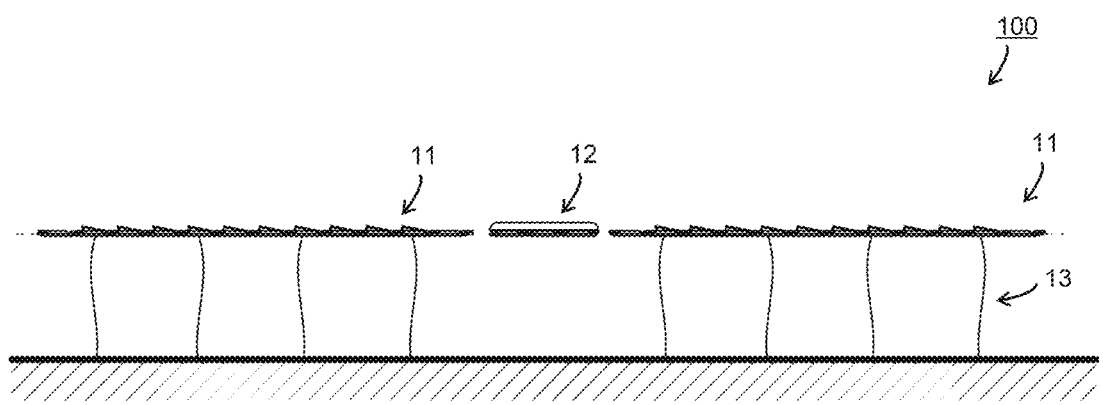
FIG. 10 is a side view of the float assembly 100.
Figure 11:
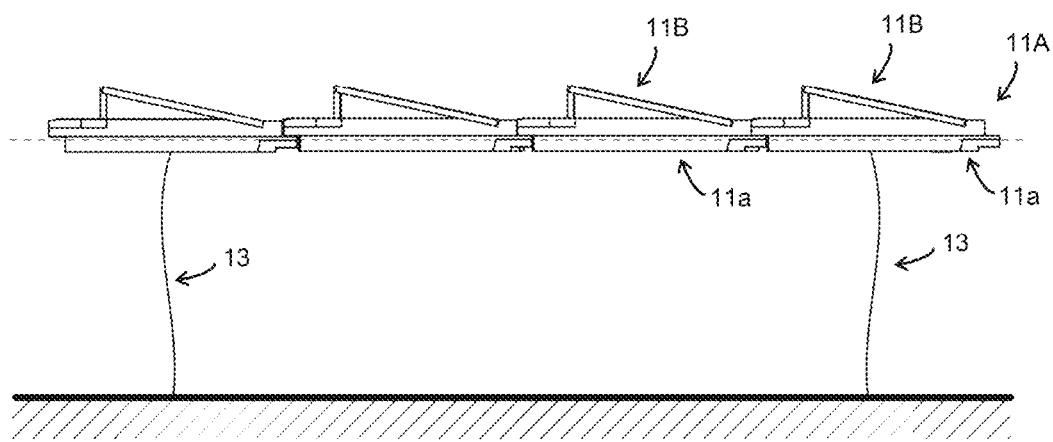
FIG. 11 is an enlarged view of the side view shown in FIG. 10.

As shown in FIGS. 6, 10, and 11, the float assembly 100 includes the power generation part 11, the attracting part 12, and the mooring wire 13. The float assembly 100 is floated on a water surface such as a pond or a lake. As shown in FIGS. 7 to 9, the float assembly 100 includes four the power generation parts 11 and one the attracting part 12. The numbers of the power generation part 11 and the attracting part 12 are not limited to these numbers. The power generation part 11 includes the solar panel 11B, but the attracting part 12 preferably does not have the solar panel, for example, the attracting part 12 may include the solar panel as long as it does not get in the way.

If the attracting part 12 includes the solar panels, for example, the number of the solar panels installed in the attracting part 12 should be less than the number of the solar panels installed in the power generation part 11. Also, the spacing between adjacent the solar panels in the attracting part 12 should be wider than the spacing between adjacent the solar panels in the power generation part 11. Also, the ratio of the installation area of all the solar panels installed in the attracting part 12 to the area of the attracting part 12 should be smaller than the ratio of the installation area of all the solar panels installed in the power generation part 11 to the area of the power generation part 11. The mooring wire 13 is connected to the float of the power generation part 11 and the attracting part 12 and an anchored part (not shown) at the bottom of the water. This anchored part comprises, for example, an anchor or sinker. Since the float assembly 100 is moored by the mooring wire 13, it is possible to prevent the float assembly 100 from being swept away from the desired area due to the flow of water or wind. In this embodiment, the mooring method of the float assembly 100 is the method in which the mooring wire 13 is anchored to the bottom of the water, but it is not limited to this, the mooring method may be the method in which the mooring wire 13 is anchored to the land.

1-1. Power Generation Part 11

The power generation part 11 has the function to generate electric power. As shown in FIGS. 7 and 8, the power generation part 11 includes the solar panel 11B and the first float 11A. The power generation part 11 includes the loads such as the cables, the power conditioner, the junction box, etc. (not shown).

1-1-1. First Float 11A

As shown in FIGS. 7 and 8, the first float 11A includes a float 11a and a connecting member 11b. The first float 11A is spaced apart from the second float 12A. The first float 11A is equipped with a plurality of the floats 11a and the connecting members 11b. That is, the first float 11A is a float unit having a plurality of the floats 11a and the connecting members 11b, and the first float 11A is equipped with a large number of the solar panels 11B. The float 11a is the smallest unit of the float that comprises the first float 11A, and the float 11a corresponds to the unit float. A plurality of the floats 11a is arranged in a grid pattern. In this embodiment, the number of the floats 11a of the first float 11A is approximately 100, but it is not limited to that number, for example, and it may be hundreds to thousands.

The connecting member 11b connects the floats 11a adjacent to each other in the first direction D1. The floats 11a adjacent to each other in the first direction D1 are not in contact with each other, and there is a spacing part Sp between the floats 11a adjacent to each other in the first direction D1. That is, the floats 11a adjacent to each other in the first direction D1 are separated from each other, and the water surface is visible from the spacing part Sp. On the other hand, the floats 11a adjacent to each other in the second direction D2 are in contact with each other, and the floats 11a adjacent to each other in the second direction D2 are connected by bolts, etc., which are omitted in the figure. The first direction D1 and the second direction D2 are orthogonal.

The float 11a includes a float with the solar panel 11B (referred to as the loaded float) and a float without the solar panel 11B (referred to as the unloaded float). The unloaded float is arranged around the loaded float. The unloaded float is connected to the mooring wire 13.

The float 11a and the float 12a of the attracting part 12 described below are formed, for example, by blow molding, in which a cylindrical parison in a molten state is sandwiched between molds and inflated. Various thermoplastics are used as the materials for the float 11a and the float 12a.

For example, polyolefin resins such as polyethylene and polypropylene are used as the materials for the float 11a and the float 12a.

1-1-2. Solar Panel 11B

The solar panel 11B is mounted in an inclined manner so that the light-receiving surface is facing south to increase the power generation efficiency. The power generated by the solar panel 11B is delivered through the cables. The DC power from the solar panel 11B is collected through the cable to the junction box, and the DC power from the junction box is converted to AC power by the power conditioner. The junction box and the power conditioner may not be installed on the first float 11A, but may be installed on the ground.

1-2. Attracting Part 12

Figure 12:
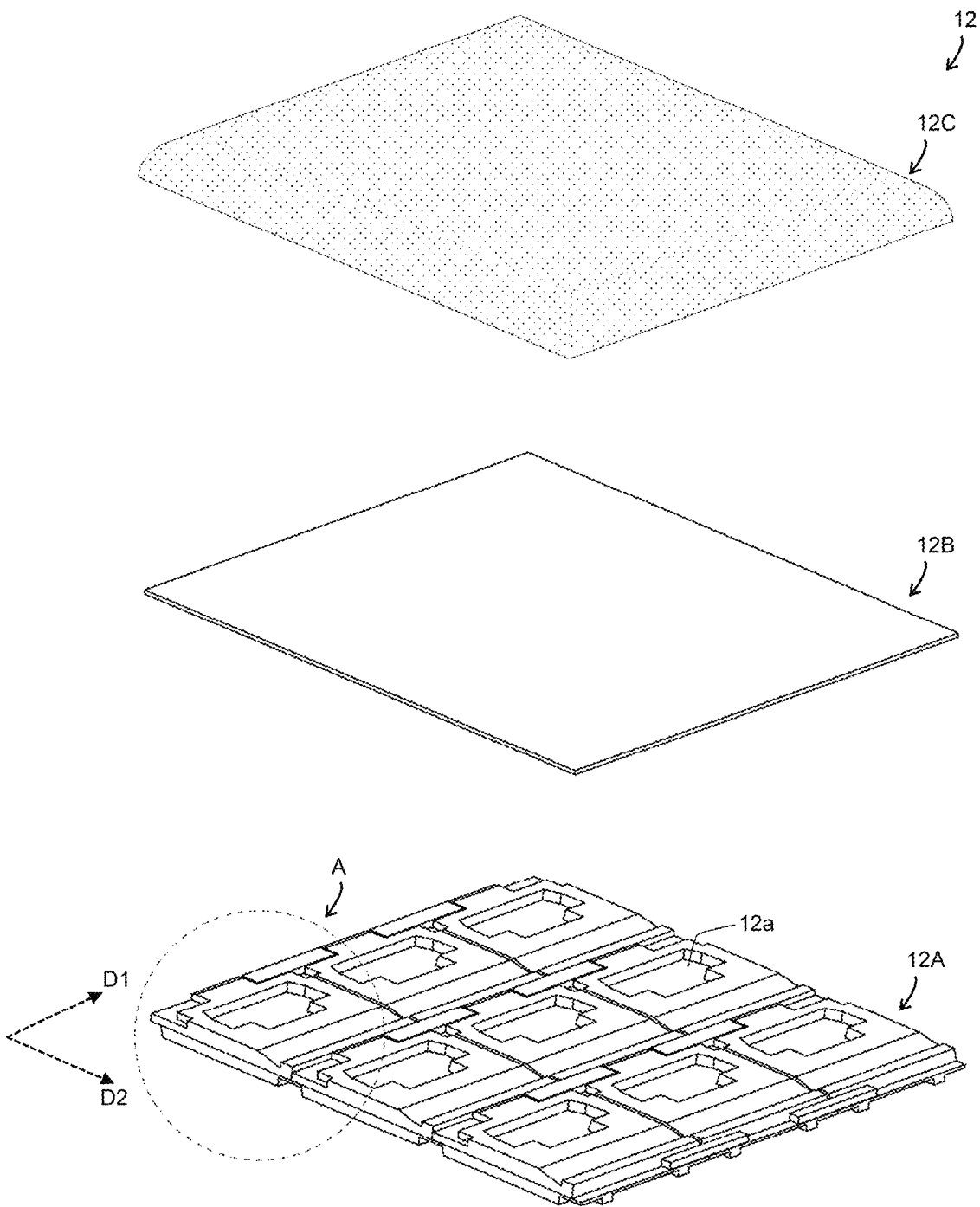
FIG. 12 is an exploded perspective view of an attracting part 12.
Figure 13:
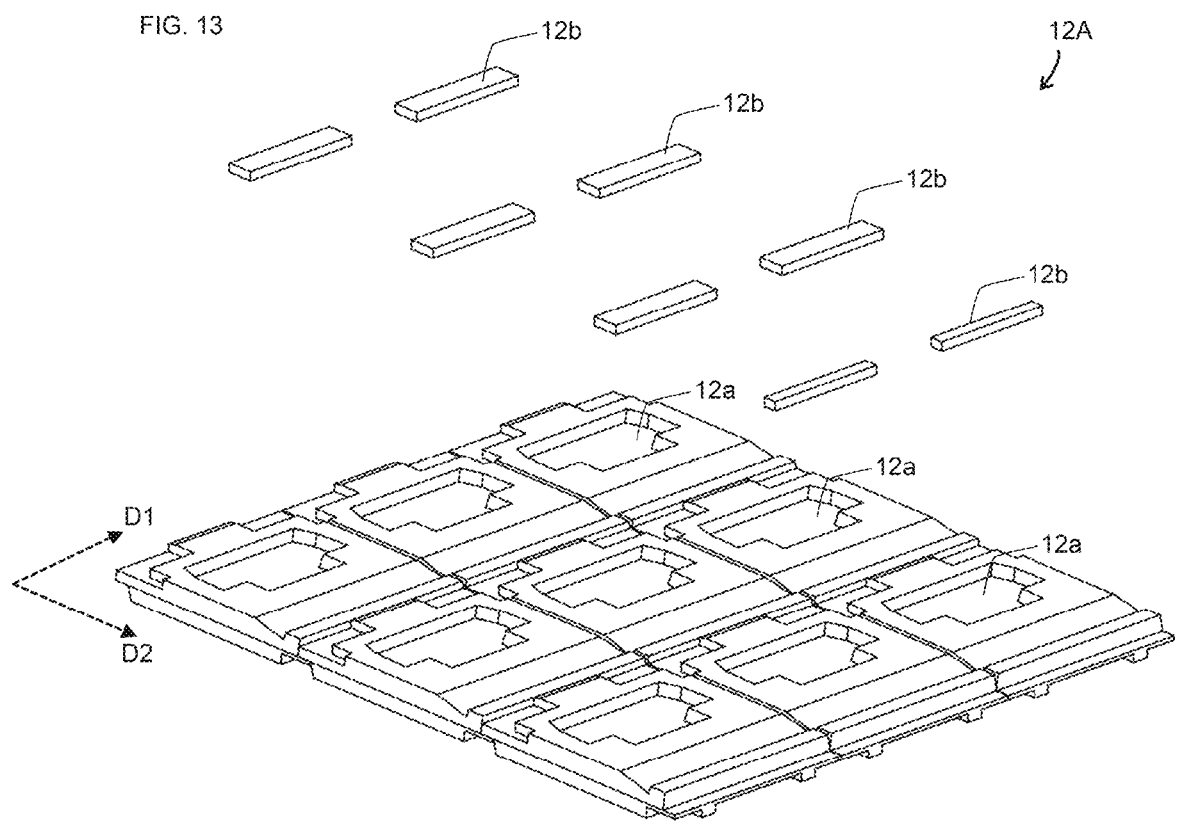
FIG. 13 is an exploded perspective view of a second float 12A.

As shown in FIG. 6, the attracting part 12 is adjoined to the power generation part 11. The attracting part 12 has the function of attracting birds to land on the attracting part 12 rather than the power generation part 11. In other words, the attracting part 12 serves as an artificial floating island to attract birds. In this embodiment, birds are not limited to any particular species, and include, for example, not only birds that live on the land, but also waterfowl and seabirds. Also, birds are not limited to wild birds, but include, for example, free-range birds. As shown in FIG. 12, the attracting part 12 includes a second float 12A, a sheet member 12B, and a sediment part 12C. In the embodiment, the attracting part 12 is configured to attract birds using the color of the attracting part 12 or the surface material of the attracting part 12. In the embodiment, the attracting part 12 is not in contact with the land, and it prevents external enemies of birds living on land from entering the attracting part 12. Also, there is no member (e.g., mooring wire, power cable, etc.) connecting the attracting part 12 to the power generation part 11 on the water or land. Therefore, it prevents external enemies of birds living on land from entering the attracting part 12 through the member that connects the attracting part 12 to the power generation part 11.

1-2-1. Second Float 12A

As shown in FIGS. 12 to 15, the second float 12A has a plurality of floats 12a and a plurality of the connecting members 12b. The second float 12A has a plurality of floats 12a and the connecting members 12b. That is, the second float 12A is a float unit having a plurality of floats 12a and the connecting members 12b. The second float 12A is not equipped with the solar panel. Also, the second float 12A is also not equipped with the loads described above, such as the cables, the power conditioner, and the junction box.

The float 12a is the smallest unit of the float that comprises the second float 12A, and the float 12a corresponds to the unit float. The float 12a can be the same shape as the float 11a or a different shape. If the float 12a has the same shape as the float 11a, the manufacturer can divert the mold and suppress the manufacturing cost. A plurality of the floats 12a is arranged in a grid pattern. In this embodiment, the number of the floats 12a of the second float 12A is approximately 9, but it is not limited to that number, for example, and it may be tens to thousands.

A plurality of the floats 12a is spread out so that the water surface just below the second float 12A is hidden. That is, since the spacing part Sp is formed on a plurality of floats 11a, the water surface just below the first float 11A is exposed through the spacing part Sp, whereas the water surface just below the second float 12A is not exposed. Therefore, this makes it easier for birds to land on the attracting part 12 and for the attracting part 12 to attract birds.

The second float 12A is surrounded by the first float 11A. Thus, the wind from the pond or lake is blocked to some extent in the power generation part 11, and the wind in the attracting part 12 is weakened. That is, the float assembly 100 can provide birds with an environment where they can rest easily. In the embodiment, the second float 12A is surrounded by four isolated the first float 11A, but it is not limited to this form. For example, the second float 12A may be arranged in the center of one circular the first float 11A.

Figure 15:
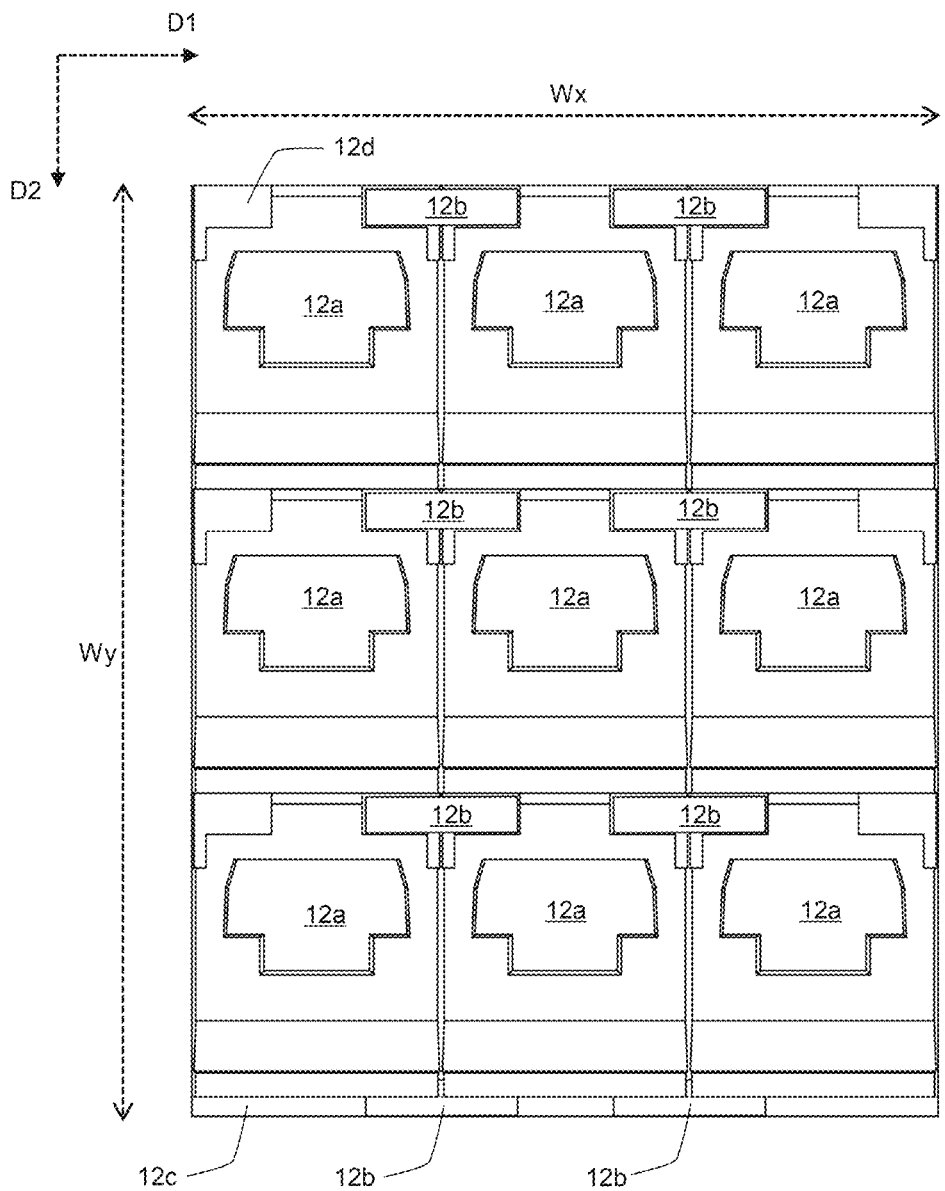
FIG. 15 is a top view of the second float 12A.

Birds may not be attracted to elongated shapes. Therefore, the shape of the second float 12A is not extremely elongated. That is, as shown in FIG. 15, the ratio t of the width Wx of the second float 12A in the first direction D1 to the width Wy of the second float 12A in the second direction D2 is within a predetermined value or range. In the embodiment, the ratio t is defined as (the width of the second float 12A in the first direction D1, Wx)/(the width of the second float 12A in the second direction D2, Wy). The ratio t is, for example, 0.30, 0.35, 0.40, 0.45, 0.50, 0.55, 0.60, 0.65, 0.70, 0.75, 0.80, 0.85, 0.90, 0.95, or 1.00. Also, the ratio t is maybe within the range between any two of the values described here. Therefore, once the ratio t is determined, the shape of the second float 12A will not be extremely elongated, making it easier for birds to be attracted to the attracting part 12.

Figure 14:
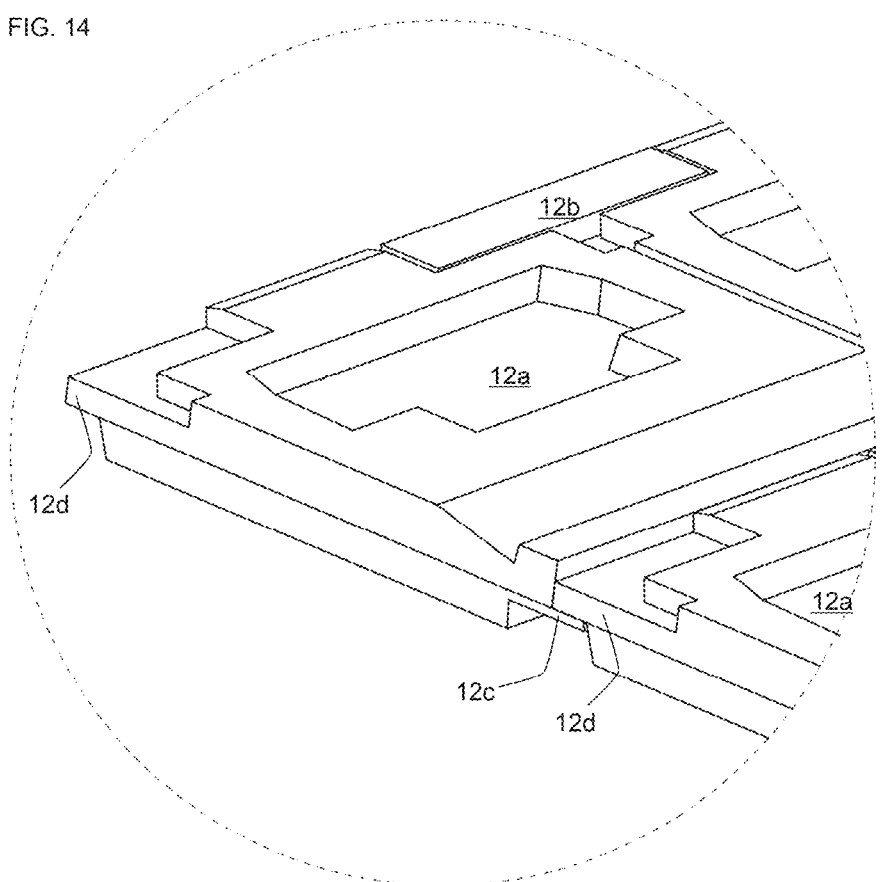
FIG. 14 is an enlarged view of region A shown in FIG. 12.

The connecting member 12b connects the floats 12a adjacent to each other in the first direction D1. The floats 12a adjacent to each other in the first direction D1 are in contact with each other. The floats 11a adjacent to each other in the second direction D2 are also in contact with each other, and the floats 12a adjacent to each other in the second direction D2 are connected by bolts, etc., which are omitted in the figure. Specifically, as shown in FIG. 14, each float 12a has a first end 12c and a second end 12d. The second end 12d of one of the adjacent floats 12a is arranged on the first end 12c of the other float 12a. Then, the first end 12c and the second end 12d are in contact with each other. The first end 12c and the second end 12d are connected by bolts, for example.

It is known that birds may prefer colors with relatively high brightness, such as white, to colors with relatively low brightness, such as black. Therefore, the surface of the second float 12A is preferable to have a higher brightness than the surface of the first float 11A. For example, the color of the entire surface of the second float 12A is preferable to be white, and the color of the entire surface of the first float 11A is preferable to be black. The colors are not limited to white or black. The color of the surface of the first float 11A and the surface of the second float 12A can be set appropriately according to the colors that birds like and dislike. For example, it is known that birds in the Charadriiformes Laridae prefer colors with relatively high luminosity, such as white, to colors with relatively low luminosity, such as black. An example of a bird in the Charadriiformes Laridae is the Sterna. This embodiment is suitable for birds in the Charadriiformes Laridae.

Here, in the embodiment, the top surface of the second float 12A is not exposed because the sheet member 12B is placed on the top surface of the second float 12A. However, the sides of the second float 12A are exposed from the sheet member 12B. Therefore, if the surface of the second float 12A has a higher brightness than the surface of the first float 11A, it can be expected to attract birds.

In the embodiment, a spacing distance W (see FIG. 9) between the outer periphery of the second float 12A and the inner periphery of the first float 11A is approximately 30 meters. If the spacing distance W is too large, the attracting part 12 will not be able to attract birds well, and there is a high risk that birds will land on the power generation part 11.

On the contrary, if the spacing distance W is too small, birds that landed on the attracting part 12 will easily move to the power generation part 11, and also, the external enemies of birds that live on land will easily enter the attracting part 12. Therefore, the spacing distance W is, for example, 5 m, 10 m, 20 m, 25 m, 30 m, 35 m, 40 m, 45 m, or 50 m. Also, the spacing distance W is maybe within the range between any two of the values described here.

Further, in the embodiment, the area of the second float 12A is smaller than the area of the first float 11A. Also, the mooring wire 13 is connected to the float that is located at the periphery of the float 12a.

Also, In the embodiment, since the various components (e.g., the sheet member 12B, etc.) are mounted on the second float 12A and the solar panel 11B, etc., are mounted on the first float 11A, the brightness of the surface of the attracting part 12, the surface of the attracting part 12 (i.e., the surface as a whole including the second float 12A and the sheet member 12B) is more preferable to have a higher brightness than the surface of the power generation part 11 (i.e., the surface as a whole including the first float 11A and the solar panel 11B).

1-2-2. Sheet Member 12B

As shown in FIG. 12, the sheet member 12B has a shape that corresponds to the top view shape of the second float 12A. In the embodiment, the top view shape of the second float 12A is a rectangle, so the top view shape of the sheet member 12B is also a rectangle. The sheet member 12B is arranged on the second float 12A, and the sediment part 12C is arranged on the sheet member 12B. If the sediment part 12C is arranged directly on the second float 12A, the sand in the sediment part 12C may pass through a small gap in the second float 12A (for example, the connecting part between the floats 12a) and fall to the water surface. For this reason, the attracting part 12 has the sheet member 12B between the second float 12A and the sediment part 12C.

The surface of the sheet member 12B is preferable to have a higher brightness than the surface of the first float 11A. For example, white is the preferable color for the entire top surface of the sheet member 12B. In the embodiment, the top surface of the sheet member 12B is not exposed because the sediment part 12C is arranged on the top surface of the sheet member 12B. Here, since the float assembly 100 is located on a pond or lake, the attracting part 12 is exposed to rain and wind. Therefore, the sand in the sediment part 12C may be blown to the water surface, and a part of the sheet member 12B may be exposed. Therefore, if the surface of the sheet member 12B has a higher brightness than the surface of the first float 11A, it is expected to be effective in attracting birds.

The attracting part 12 of the float assembly 100 relating to the embodiment has the sheet member 12B, but the sheet member 12B is not a required configuration. The sediment part 12C may be installed directly on the second float 12A.

1-2-3. Sediment Part 12C

The sediment part 12C comprises, for example, soil, sand, stones, and grass, trees, etc. The sediment part 12C can be designed in a manner so that it does not affect the power generation. For example, the sediment part 12C is preferable to be designed in a manner that the shadow of the sediment part 12C does not fall on the solar panel. The surface material of the power generation part 11 is artificial, such as resin, glass, and metals. In contrast, since the surface material of the sediment part 12C is natural such as soil, sand, stones, and grass, the sediment part 12C can attract birds. Some birds build their nests on the ground or lay their eggs on the ground. Such birds are effectively attracted to the sediment part 12C.

The attracting part 12 of the float assembly 100 relating to the embodiment has the sediment part 12C, but the sediment part 12C is not a required configuration. The attracting part 12 needs to have at least the second float 12A. In this case, making the brightness of the surface of the second float 12A higher than the brightness of the surface of the first float 11A, the attracting part 12 can attract birds.

1-3. Mooring Wire 13

The first float 11A is independently moored to the second float 12A. That is, as shown in FIGS. 10 and 11, the mooring wire 13 that moors the first float 11A is a different wire from the mooring wire 13 that moors the second float 12A. The mooring wire 13 that moors the first float 11A moors only the first float 11A, and in the same way, the mooring wire 13 that moors the second float 12A moors only the second float 12A.

2. Advantageous Effects of Embodiment

In the float assembly 100 relating to the embodiment, the attracting part 12 has the second float 12A, and the attracting part 12 is adjoined to the power generation part 11, and the attracting part 12 is configured to attract birds. This can attract birds to the attracting part 12 and prevent birds from landing on the power generation part 11.

This prevents birds from getting on the solar panel 11B and damaging the solar panel 11B, and birds from getting on the first float 11A and damaging the float 11a. As a result, the float assembly 100 relating to the embodiment can prevent the photovoltaic generation device from failing and the photovoltaic generation device from being unable to generate electricity.

Also, it prevents birds from eating and dropping on the power generation part 11 and contaminating the solar panel 11B. As a result, the float assembly 100 relating to the embodiment can suppress the decrease in power generation efficiency and the increase in the cost of cleaning (maintenance) of the solar panel 11B, etc.

3. Modification

The attracting part does not necessarily have to be surrounded by the first float 11A. As shown in FIG. 16, the attracting part 120 is adjoined to the outside of the first float 11A. Even in this configuration, the same effect as in the embodiment can be obtained.

In the embodiment, the color of the attracting part 12, the surface material of the attracting part 12, and the shape of the attracting part 12 are shown as the means of attracting birds. In addition to these, the power generation part 11 can be equipped with a device that generates sounds that birds are uncomfortable with. This makes the attractiveness of the attracting part 12 relatively larger than that of the power generation part 11, making it easier for birds to be attracted to the attracting part 12. Also, the power generation part 11 should have a smell that birds do not like, and the attracting part 12 should have a smell that birds like. The power generation part 11 can be equipped with repellents (e.g., animals that are external enemies of birds, models of these animals, bird carcasses, models of bird carcasses), and the attracting part 12 can be equipped with attractants (e.g., food).

The power generation part 11 may be moored so that it can rotate around the attracting part 12. This makes it possible to face the light-receiving surface of the solar panel 11B in the direction where the sun is located, even if the sun moves with time.

In this embodiment, the float assembly 100 is described as an example of a configuration that has the function of actively attracting birds, but it is not limited to this. The float assembly 100 may have the function part instead of the attracting part 12. The function part is an optional function, without the mandatory function of actively attracting birds. The function part is common to the attracting part 12 in having the second float 12A. The second float 12A of the function part is far away from the first float 11A of the power generation part 11. Also, the second float 12A of the function part is independently moored to the first float 11A. Also, the function part may be equipped with the solar panels, but the number of the solar panels per area of the function part is less than the number of the solar panels per area of the power generation part 11. In other words, the number of the solar panels per area of the power generation part 11 is larger than the number of the solar panels per area of the function part.

When the function part is provided with the second float 12A, it is expected to improve the water quality around the function part. For example, when the function part is floated, the region of the water surface under the function part is shaded, which suppresses the excessive growth of plankton in the water and is expected to improve the water quality.

Also, the function part serves as a hiding place for fish (e.g., fish, shellfish, crustaceans, etc.) and the effect of attracting fish to the function part and its surroundings is also expected. For example, organisms that feed on plankton will be attracted to the function part, which will improve the water quality. Also, since the function part is a feeding ground for fish, the effect of attracting birds to the function part is also expected.

REFERENCE SIGNS LIST

1: float assembly
1a: assembly periphery
2: float
2A: peripheral float
2B: mooring float
2C: filled float
2Ca: top surface
2Cb: portion
2D: free float
3: joint
4: solar panel
5: mooring member
G: bottom
PL: parting line
WS: water surface
11: power generation part
11A: first float
11B: solar panel
11a: float
11b: connecting member
12: attracting part
120: attracting part
12A: second float
12B: sheet member
12C: sediment part
12a: float
12b: connecting member
12c: first end part
12f: second end part
13: mooring wire
100: float assembly
A: region
Ar: arrow
D1: first direction
D2: second direction
W: spacing distance
Sp: spacing part

The invention claimed is:

1. A float assembly including a plurality of floats connected together comprising:
a loaded float with a load, and
an unloaded float without the load, wherein
a loaded float does not have a filled float,
an unloaded float has a filled float having a hollow portion,
the hollow portion has a part filled with a filler, and
the filled float is arranged at a position facing an assembly periphery surrounding the float assembly.

2. The float assembly of claim 1, wherein the filler is a fluid.

3. The float assembly of claim 1, wherein the filled float is inclined so that a sunk amount increases toward the assembly periphery.

4. The float assembly of claim 1, wherein
in a state that the float assembly floats on a water surface, the filled float has an inclined surface becoming lower toward the assembly periphery, and
the inclined surface is a portion which is provided on a side surface of the filled float facing the assembly periphery and is above the water surface.

5. A float assembly including a plurality of floats connected together comprising:
a filled float having a hollow portion, wherein
the hollow portion has a part filled with a filler, and the filled float is arranged at a position facing an assembly periphery surrounding the float assembly, and
in a state that the float assembly floats on a water surface, a parting line of the filled float has a part located below the water surface.

6. The float assembly of claim 1, wherein one end of a mooring member is not anchored to the filled float.

* * * * *